H. A. MYERS.
ANTIFRICTION BEARING.
APPLICATION FILED MAR. 4, 1912.
1,122,987.
Patented Dec. 29, 1914.
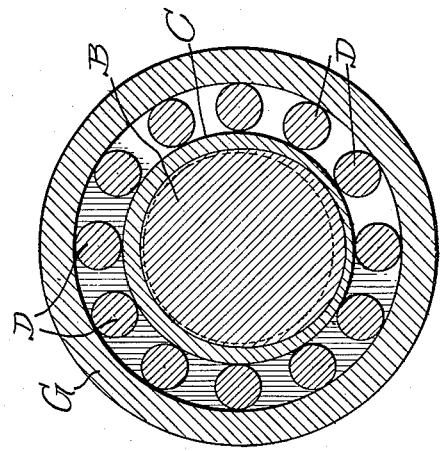
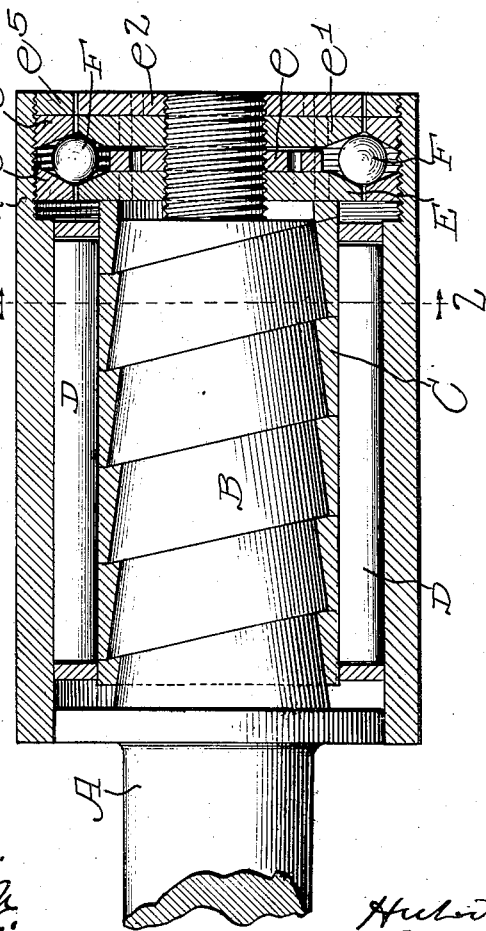

UNITED STATES PATENT OFFICE.

HUBERT A. MYERS, OF GOSHEN, INDIANA, ASSIGNOR OF ONE-HALF TO ARTHUR S. HICKOK, OF TOLEDO, OHIO.

ANTIFRICTION-BEARING.

1,122,987.  Specification of Letters Patent.  Patented Dec. 29, 1914.

Application filed March 4, 1912. Serial No. 681,355.

*To all whom it may concern:*

Be it known that I, HUBERT A. MYERS, a citizen of the United States of America, and resident of Goshen, Elkhart county, Indiana, have invented a certain new and useful Improvement in Antifriction-Bearings, of which the following is a specification.

My invention relates to anti-friction bearings in general, but more particularly to those in which a wearing sleeve is employed for taking up wear, and especially to roller bearings of this kind in which the said sleeve is in the form of a spiral coil spring.

The object of my invention, generally stated, is to provide a novel and efficient roller bearing of this character.

A special object is to provide an improved construction and arrangement whereby a spiral wedge is employed for changing the diameter of the spiral coil wearing sleeve when it is adjusted to take up wear.

Another object is to provide an improved construction and arrangement whereby one of the elements of the mechanism for adjusting the said spiral coil sleeve serves also as a member of the thrust bearing by which the wheel or other rotary element is held against axial movement.

To these and other useful ends, my invention consists in matters hereinafter set forth and claimed.

In the accompanying drawings: Figure 1 is a longitudinal section of a roller bearing embodying the principles of my invention. Fig. 2 is a transverse section on line 2—2 in Fig. 1.

As thus illustrated, my invention comprises an axle A formed or provided with a spiral wedge B, the convolutions of which are each given a straight bevel from one edge thereof to the other. Thus the wedge formation is uniform from one end to the other, the bevel being the same throughout the length of the wedge. The spiral spring or coil sleeve C fits the said wedge, and has its convolutions formed tight together, whereby the cylindric outer surface of said sleeve is smooth and practically continuous. Thus the said sleeve has an interior spiral wedge formation to fit the rigid axle, and the outer surface of said sleeve provides a wearing surface for the rollers D of the bearing. These rollers may be held in place in any suitable manner, and the sleeve C is held in place by a nut E, the latter being used for forcing the sleeve farther on to the axle to expand the sleeve when it is desired to take up wear. This nut E is beveled to engage the anti-friction balls F of the thrust bearing by which the wheel hub G is kept from shifting endwise. A lock nut $e$ is also screwed upon the end of the axle, as shown, and another nut $e^1$ is then screwed upon the axle to engage the balls at the other side thereof. A lock nut $e^2$ keeps the nut $e^1$ in place, and the balls travel between the beveled rings $e^3$ and $e^4$ screwed into the hub. These rings are held in the hub by the lock nut ring $e^5$. Thus the nut E serves a double purpose, being both a part of the roller bearing adjusting means and a part of the thrust bearing.

The convolutions of the coiled wearing sleeve C are tight together when the sleeve is first made, and for this reason the endwise adjustment of this sleeve is of a bodily nature, and the expansion of the sleeve is uniform from end to end, because the endwise movement of the sleeve is the same and uniform throughout the length thereof.

It is obvious that the bearing can be reversed, and that the spiral wedge and coil sleeve can be outside of the rollers if desired.

Other modifications are obvious, and I do not, therefore, limit myself to the exact form or construction shown.

It will be seen that the adjusting mechanism is dependent upon an endwise thrust or pressure in the bearing, in order to expand the helical sleeve or spring, and that the forcible rotation of the said spring or coil is not necessary, and forms no part of the inherent mode of operation of said mechanism. The adjusting nut serves not only to exert an endwise thrust or push on the end of the spiral wearing sleeve, but also serves to hold the latter in position against the tension thereof. This is because the normal tension of the sleeve serves to keep the convolutions thereof tight together, and causes the sleeve to have a tendency to recover its normal position, after being adjusted to take up wear. For the broader purposes of my invention, any suitable means can be employed for engaging the wearing surface of the spiral sleeve. If the bearing is of the anti-friction variety, then rollers, such as shown, can be employed for this purpose. In such case, the adjusting mechanism has an added advantage, in view of the fact that the said rollers can be parallel.

I do not limit myself to the exact construction shown and described.

What I claim as my invention is:

1. In a roller bearing, a set of rollers, a spiral coil providing a cylindric wearing surface for said rollers to travel over, a nut engaging the end of said coil, whereby the coil is given bodily endwise adjustment, and means including a rigid spiral wedge of fixed form and length, whereby adjustment of said nut changes the diameter of said coil to take up wear, all of the convolutions of said coil being in contact with each other and tight together to render said wearing surface smooth and practically continuous in character for all adjustments of said bearing, and to insure uniform adjusting action throughout the length thereof.

2. In a roller bearing, a set of rollers, a spiral coil providing a cylindric wearing surface for said rollers to travel over, a nut engaging the end of said coil, a screw threaded part engaging said nut, and means including a rigid spiral wedge of fixed form and length, whereby adjustment of said nut changes the diameter of said coil to take up wear, said spiral wedge being formed with uniformly beveled convolutions integrally united at their edges.

3. In a roller bearing, a set of rollers, a spiral coil providing a cylindric wearing surface for said rollers to travel over, means for adjusting the coil endwise, and means including a spiral wedge whereby bodily endwise adjustment of said coil changes the diameter thereof to take up wear, said spiral wedge being inside of said sleeve, and an axle with which said wedge is solidly united, whereby said wedge is of fixed diameter and length, the bevel or pitch of said wedge being uniform throughout the spiral engaging surface thereof.

4. In a roller bearing, a set of rollers, a spiral coil providing a cylindric wearing surface for said rollers to travel over, means for adjusting the coil endwise, and means including a spiral wedge whereby bodily endwise adjustment of said coil changes the diameter thereof to take up wear, said spiral wedge having beveled convolutions, and the inside of said coil being formed with a spiral bevel engaging the said bevel of the wedge, said wedge being of fixed diameter and length, the bevel or pitch of said wedge being uniform throughout the spiral engaging surface thereof.

5. In a roller bearing, a set of rollers, a spiral coil providing a cylindric wearing surface for said rollers to travel over, means for adjusting the coil endwise, and means including a spiral wedge whereby bodily endwise adjustment of said coil changes the diameter thereof to take up wear, each convolution of said wedge having a bevel extending from one edge thereof to the other, said wedge being of fixed diameter and length, the bevel or pitch of said wedge being uniform throughout the spiral engaging surface thereof.

6. In a roller bearing, a set of rollers, a spiral coil providing a cylindric wearing surface for said rollers to travel over, means for exerting a simple endwise thrust on one end only of said coil, and means including a rigid spiral wedge of fixed form and length, whereby said thrust changes the diameter of said coil to take up wear, the opposite ends of said coil being of the same internal and external diameter, the said coil having all the convolutions thereof in contact with each other and retained thus tight together by the endwise thrust thereon, whereby said wearing surface is smooth and practically unbroken throughout the entire area thereof, for all adjustments of said bearing.

7. In a bearing, a spiral coil providing a cylindric wearing surface, means engaging said surface, a nut engaging the end of said coil, whereby said coil is given bodily endwise adjustment, and means including a rigid spiral wedge of fixed form and length, whereby adjustment of said nut changes the diameter of said coil to take up wear, all of the convolutions of said coil being in contact with each other and tight together to render said surface smooth and practically continuous in character for all adjustments of said bearing, and to insure uniform adjusting action throughout the length thereof.

8. In a bearing, a spiral coil providing a cylindric wearing surface, means engaging said surface, a nut engaging the end of said coil, a screw threaded part engaging said nut, and means including a rigid spiral wedge of fixed form and length, whereby adjustment of said nut changes the diameter of said coil to take up wear, said spiral wedge being formed with uniformly beveled convolutions integrally united at their edges.

9. In a bearing, a spiral coil providing a cylindric wearing surface, means engaging said surface, means for adjusting the coil endwise, and means including a spiral wedge whereby bodily endwise adjustment of said coil changes the diameter thereof to take up wear, said spiral wedge being inside of said sleeve, and an axle with which said wedge is solidly united, whereby said wedge is of fixed diameter and length, the bevel or pitch of said wedge being uniform throughout the spiral engaging surface thereof.

10. In a bearing, a spiral coil providing a cylindric wearing surface, means engaging said surface, means for adjusting the coil endwise, and means including a spiral wedge whereby bodily endwise adjustment of said coil changes the diameter thereof to take up wear, said spiral wedge having beveled convolutions, and the inside of said coil being formed with a spiral bevel engaging the said bevel of the wedge, said wedge being of fixed diameter and length, the bevel or pitch of said wedge being uniform throughout the spiral engaging surface thereof.

11. In a bearing, a spiral coil providing a cylindric wearing surface, means engaging said surface, means for adjusting the coil endwise, and means including a spiral wedge whereby bodily endwise adjustment of said coil changes the diameter thereof to take up wear, each convolution of said wedge having a bevel extending from one edge thereof to the other, said wedge being of fixed diameter and length, the bevel or pitch of said wedge being uniform throughout the spiral engaging surface thereof.

12. In a bearing, a spiral coil providing a cylindric wearing surface, means engaging said surface, means for exerting a simple endwise thrust on one end only of said coil, and means including a rigid spiral wedge of fixed form and length, whereby said thrust changes the diameter of said coil to take up wear, the opposite ends of said coil being of the same internal and external diameter, the said coil having all the convolutions thereof in contact with each other and retained thus tight together by the endwise thrust thereon, whereby said wearing surface is smooth and practically unbroken throughout the entire area thereof, for all adjustments of said bearing.

13. A bearing comprising means for taking up wear, said means including a spiral coil spring, and mechanism for causing a variation in the diameter of said spiral coil spring, having provisions whereby said variation is necessarily uniform throughout the length of said spiral coil spring, said bearing having means for engaging the surface of said spring, movable thereon about the axis of the bearing, said provisions including a series of engaging portions extending longitudinally of the bearing, one for each convolution of the spring, and of fixed relation to each other.

14. A bearing comprising means for taking up wear, said means including a spiral coil spring, and mechanism for causing a variation in the diameter of said spiral coil spring, having provisions whereby said variation is necessarily uniform throughout the length of said spiral coil spring, and whereby the spring is dependent upon an axial thrust or pressure in the bearing for the adjustment thereof, the sides of the convolutions of said spring engaging each other for all conditions thereof, said bearing having means for engaging the surface of said spring, movable thereon about the axis of the bearing, said provisions including a series of engaging portions extending longitudinally of the bearing, one for each convolution of the spring, and of fixed relation to each other.

15. A bearing comprising means for taking up wear, said means including a spiral coil spring, and mechanism for causing a variation in the diameter of said coil spring, having provisions whereby said variation is necessarily uniform throughout the length of said spiral coil spring, said mechanism including a spiral wedge of fixed length and diameter, and means for causing relative axial movement between said wedge and spring, said bearing having means for engaging the surface of said spring, movable thereon about the axis of the bearing, said provisions including a series of engaging portions extending longitudinally of the bearing, one for each convolution of the spring, of fixed relation to each other, and forming said spiral wedge.

Signed by me at Chicago, Illinois, this 29th day of February, 1912.

HUBERT A. MYERS.

Witnesses:
S. Lewis,
S. L. Glover.